United States Patent
Huang et al.

(10) Patent No.: US 7,433,373 B2
(45) Date of Patent: Oct. 7, 2008

(54) ACTIVELY Q-SWITCHED LASER SYSTEM USING QUASI-PHASE-MATCHED ELECTRO-OPTIC Q-SWITCH

(75) Inventors: Yen-Chieh Huang, Hsinchu (TW); Yen-Hung Chen, Taichung (TW)

(73) Assignee: National Tsing Hua University, Hsinchu (TW)

(*) Notice: Subject to any disclaimer, the term of this patent is extended or adjusted under 35 U.S.C. 154(b) by 171 days.

(21) Appl. No.: 10/866,777

(22) Filed: Jun. 15, 2004

(65) Prior Publication Data

US 2005/0276285 A1    Dec. 15, 2005

(51) Int. Cl.
  *H01S 3/11* (2006.01)
(52) U.S. Cl. .......................................... 372/10; 372/21
(58) Field of Classification Search ................... 372/10, 372/17, 21, 12, 22
  See application file for complete search history.

(56) References Cited

U.S. PATENT DOCUMENTS

| | | | | |
|---|---|---|---|---|
| 4,965,803 A | * | 10/1990 | Esterowitz et al. ............. | 372/5 |
| 5,640,405 A | * | 6/1997 | Wallace et al. ................ | 372/21 |
| 5,802,086 A | * | 9/1998 | Hargis et al. .................. | 372/22 |
| 6,016,214 A | * | 1/2000 | Meyer et al. .................. | 359/237 |
| 6,101,023 A | * | 8/2000 | Meyer et al. .................. | 359/330 |
| 6,304,237 B1 | * | 10/2001 | Karakawa .................... | 345/84 |
| 7,058,093 B2 | * | 6/2006 | Kennedy et al. ............... | 372/10 |

* cited by examiner

*Primary Examiner*—Minsun Harvey
*Assistant Examiner*—Tuan N. Nguyen
(74) *Attorney, Agent, or Firm*—Bacon & Thomas, PLLC

(57) ABSTRACT

A Q-switched laser system is disclosed. The laser system employs a quasi-phase-matched electro-optic (QPM EO) crystal as the laser Q-switch. When applied with a certain modulating electric field, the QPM EO crystal can function as a polarization rotator to rotate the polarization direction of the resonant laser beam in a polarization-dependent laser resonator, thereby switching the laser resonator between high-loss and low-loss cavity states to achieve laser Q-switching. Compared with traditional electro-optic Q-switched laser system, the disclosed laser system is characterized by a low switching-voltage, reduced cost, and compactness. A quasi-phase-matched electro-optically Q-switched wavelength-conversion and wavelength-tunable laser system is also disclosed. The disclosed laser system integrates a QPM electro-optic Q-switch and a QPM nonlinear wavelength converter in a single crystal substrate to perform a high-efficiency intracavity wavelength conversion. The disclosed laser system is therefore simple and compact and has lower system requirements on wall-plug power and higher overall conversion efficiency.

10 Claims, 7 Drawing Sheets

ACTIVELY Q-SWITCHED LASER SYSTEM USING QUASI-PHASE-MATCHED ELECTRO-OPTIC Q-SWITCH

FIELD OF THE INVENTION

The present invention is related to an actively Q-switched laser system using a quasi-phase-matched (QPM) nonlinear optical material as an electro-optic (EO) laser Q-switch. The QPM EO laser Q-switch functions as a laser polarization rotator to control the laser cavity loss during laser Q-switching. The present invention is also related to an actively Q-switched laser system using a quasi-phase-matched electro-optic (QPM EO) laser Q-switch integrated with a QPM laser wavelength converter. The present invention belongs to the technical fields of coherent light sources, solid-state laser, EO laser Q-switch, and QPM nonlinear wavelength conversion. The present invention can also be categorized into the technical fields of actively Q-switched laser, intra-cavity laser frequency conversion, and QPM nonlinear optics.

BACKGROUND OF THE INVENTION

With the rapid advancement of laser technology, various kinds of lasers and laser devices have been extensively employed in numerous application fields. In particular, important progresses in material science have produced efficient coherent light sources with compactness, robustness and low cost. For instance, diode laser is a popular laser source because of its small volume, reduced power consumption, ease of mass production, and low manufacturing cost. To further expand the laser spectral and temporal quality, for instance, diode-laser pumped solid-state (DPSS) lasers are also playing key roles among coherent light sources. A DPSS laser employs one or plural diode lasers as its optical pump source, comprising laser gain medium that absorbs the pump diode laser energy and a laser resonant cavity that resonates the emission wavelength from the laser gain medium. In such a scheme, lasers with various wavelengths can be produced as desired by the choices of proper laser gain media.

Nonlinear optics allows optical frequency mixing to generate optical wavelengths not limited by atomic or molecular energy transitions in a laser host material. Therefore, wavelength-tunable coherent light sources can be built with the installation of an additional nonlinear crystal inside or outside a laser cavity. Usually, the size of a solid-state laser gain medium or a nonlinear optical material varies from millimeters to centimeters and thus the physical size of a DPSS laser with or without a nonlinear wavelength converter can be in the range of several centimeters. Furthermore, the beam quality, output power, and power stability of a DPSS laser are also greatly improved from those of a diode laser.

The research-and-development (R&D) progress of nonlinear-optics technology has provided unprecedented improvement to coherent light sources. To perform nonlinear wavelength conversion, intra-cavity and extra-cavity installations of the nonlinear optical material in a solid-state laser are the most common two schemes. In nonlinear wavelength conversion, phase-matching or wave-vector matching among mixing waves is often required, which is usually achieved in a birefringence crystal with the mixing waves polarized and incident in certain directions with respect to the crystal axes. Such a stringent phase-matching requirement usually leads to a fairly limited energy-conversion efficiency due to, for example, Poynting walk-off in a birefringence crystal or a non-ideal nonlinear coefficient at the phase-matching angle. In recent years, the so-called quasi-phase matching (QPM) technique has mostly lifted the above constraints by compensating the phase mismatch of mixing waves with a nonlinear optical material having a spatially modulated nonlinear coefficient. Such a QPM method allows a nonlinear-wavelength conversion process to access the maximum nonlinear coefficient of a nonlinear optical material, providing a better nonlinear conversion efficiency.

Generally speaking, the power of a continuous wave (CW) laser varies from several milliwatts to several watts. However, many important laser applications require high peak laser power within a certain laser pulse width. In particular, a high peak laser power favors nonlinear wavelength conversion. Second-order nonlinear wavelength conversion utilizes the second-order nonlinear susceptibility and in general an easier technique compared to a third-order nonlinear wavelength conversion. Among second-order nonlinear wavelength-conversion processes, an optical parametric process allows wavelength tuning but usually a much higher pump power than that for, say, second harmonic generation. Laser Q-switching is a common way of obtaining a high peak laser power from a laser source.

The working principle of a Q-switched laser is based on a technique in which the laser energy is accumulated in a time period comparable to the laser upper level lifetime and is released in an extremely short period of time to generate a high-power laser pulse. Thus, a high-quality laser Q-switch is crucial for a Q-switched laser source. Among miscellaneous laser Q-switching techniques, the EO laser Q-switching technique has a shortest switching time (on the order of tens of nanoseconds), a high timing accuracy, good stability, and excellent repeatability. However, the EO Q-switch in a typical Q-switched laser system is costly, bulky, and requires a nanosecond high-voltage pulse generator producing a few hundred to several thousand volts.

The present invention adopts a novel EO QPM nonlinear optical material as a laser Q-switch that has a much lower Q-switch voltage than a conventional EO Q-switch crystal such as potassium dihydrogen phosphate (KDP), potassium titanyl phosphate (KTP), lithium niobate (LN), etc., and thus allows a compact and low-cost design for a Q-switched laser system. When the QPM EO Q-switch is cascaded to a nonlinear wavelength converter, the intracavity Q-switched nonlinear wavelength conversion generates efficiency coherent optical radiations at desirable wavelengths. The laser system is particularly simple, if the QPM EO Q-switch is integrated into a QPM nonlinear wavelength converter in a monolithic nonlinear optical material. Such a system takes the full advantage of the lithographical-fabrication flexibility for a QPM nonlinear optical material.

SUMMARY OF THE INVENTION

A primary objective of the present invention is to disclose an actively Q-switched laser system in which the laser Q-switch is based on a QPM EO crystal. The fabrication of the QPM EO crystal used in the present invention is similar to that of a nonlinear QPM crystal for wavelength conversion. However, their working principles are fundamentally different. The QPM EO crystal used in the present invention utilizes the birefringence wave-retardation effect to rotate the polarization of an incident laser beam. Taking a periodically poled lithium niobate (PPLN) crystal as an example, the named EO PPLN crystal consists of a stack of half-wave lithium-niobate plates with their crystal axes periodically rotated about the crystallographic x axis under an electric field in the y direction. Therefore, an EO PPLN crystal is governed by a birefringence QPM condition in which each domain of the PPLN structure behaves like a rotated half-wave phase retarder. The EO PPLN crystal has a QPM grating period Λ given by $$\Lambda = 2ml_c = m\frac{\lambda_0}{n_o - n_e}, \quad (1)$$

where m is an odd integer for 50%-duty-cycle domain modulation, $\lambda_0$ is the laser wavelength in vacuum, $l_c=\lambda_0/2$ $(n_o-n_e)$ is the half-wave retardation length or the coherence length of an EO PPLN crystal, and $n_o$ and $n_e$ are the refractive indices of the ordinary wave and the extraordinary wave in lithium niobate, respectively. When an electric field Ey is applied along the y direction of the PPLN crystal, the crystal axes, y and z, rotate an angle about the x axis, given by $$\theta \approx \frac{r_{51}E_y}{1/n_e^2 - 1/n_o^2}s(x), \quad (2)$$

where $r_{51}$ is the relevant Pockels coefficient and the sign function $s(x)=+1$ ($-1$) along x for +z ($-$z) domain orientation in the PPLN crystal. As a result, a z-polarized input light rotates its polarization by an angle of 4Nθ at the output after traversing N domain periods in an EO PPLN crystal. The half-wave voltage of such an EO PPLN crystal is defined to be the one that rotates the laser input polarization by 90°, given by $$V_{90°} = \frac{\pi}{4}\frac{\lambda_0}{2}\frac{\sqrt{n_o n_e}}{r_{51}n_e^2 n_o^2}\frac{d}{L_e} \quad (3)$$

for a 50% duty-cycle, first-order (m=1) EO PPLN crystal, where d is the electrode separation in y, and $L_e$ is the electrode length in x. Compared to the half-wave voltage of a conventional lithium niobate transverse amplitude modulator between crossed polarizers, given by $$V_{\pi,LN} = \frac{\lambda_0}{r_{33}n_e^3 - r_{13}n_o^3}\frac{d}{L}, \quad (4)$$

$V_{\pi,PPLN}$ is only about half of $V_{\pi,LN}$ for a given $\lambda_0 d/L$, if we choose $n_o=2.286$, $n_e=2.200$, $r_{13}=9.6$, $r_{33}=30.9$, and $r_{33}=32.6$ pm/V at 633 nm wavelength.

The actively Q-switched laser system according to the present invention at least includes a laser resonator, an optical pump source, a laser gain medium, and a QPM EO crystal. The optical pump source emits optical wavelengths that are absorbed by the laser gain medium. Laser oscillation occurs when a certain optical pumping threshold is reached. The laser Q-switching according to the present invention is implemented by using a QPM EO crystal for rotating the polarization of the resonant wave between a high-loss polarization mode and low-loss polarization mode in a polarization-dependent laser cavity. This polarization-dependent cavity loss can be achieved by using a polarization-sensitive laser gain medium such as an a-cut Nd:YVO$_4$ laser crystal, or by installing an intracavity Brewster plate. The polarization direction of the resonant laser wave is then controlled by applying a specific modulation voltage to the QPM EO crystal, such that the laser cavity is operated in a high-loss state for accumulation of the photon energy via a given pump rate within a specific period and then rapidly switched to a cavity low-loss state for a relatively much short period for dumping the accumulated laser energy in the cavity to accomplish the laser Q-switching.

Another significant objective of the present invention is to disclose an actively Q-switched wavelength-conversion and wavelength-tunable laser system. This system adopts a QPM EO crystal as the laser Q-switch and a nonlinear crystal including but not limited to a nonlinear QPM crystal as an intra-cavity wavelength converter. The operating principle and design configuration of the QPM EO crystal used in the actively Q-switched wavelength-conversion and wavelength-tunable laser system according to the present invention is the same as the aforementioned QPM EO crystal used in the actively Q-switched laser system. The length of each QPM domain of the adopted nonlinear QPM crystal is equal to the coherence length of the mixing waves in nonlinear wavelength conversion.

An actively Q-switched wavelength-conversion and wavelength-tunable laser system at least includes a laser resonator, an optical pump source, a laser gain medium, a QPM EO crystal, and a nonlinear crystal which particularly includes but not limited to a QPM nonlinear optical material. The optical pump source emits optical wavelengths that are absorbed by the laser gain medium. Laser oscillation occurs when a certain laser pumping threshold is reached. The laser Q-switching according to the present invention is implemented by using a QPM EO crystal for rotating the polarization of the resonant wave between a high-loss polarization mode and low-loss polarization mode in a polarization-dependent laser cavity. This polarization-dependent cavity loss can be achieved by using a polarization-sensitive laser gain medium such as an a-cut Nd:YVO$_4$ laser crystal, or by installing an intracavity Brewster plate. Upon laser Q-switching, a giant intracavity laser pulse energy is generated for pumping the intracavity nonlinear crystal to perform the wavelength conversion. Therefore, the wavelength converted laser is generated with very high efficiency due to the use of high intracavity pump power and then radiated through the output of this actively Q-switched wavelength-conversion and wavelength-tunable laser system.

In brief, the present invention discloses an EO Q-switched laser employing a QPM EO crystal as the laser Q-switch. This QPM EO crystal is remarkable in its reduced switching voltage compared to that of a conventional EO Q-switch. When installed with an intracavity nonlinear wavelength converter, the Q-switched laser system can efficiently generate laser wavelengths other than that fixed by the laser gain medium. Preferably, the nonlinear wavelength converter is a QPM nonlinear optical crystal of the same material as the QPM EO crystal, monolithically integrated with the QPM EO crystal in a single crystal.

The other objects, features and advantages of the present invention, will become more apparent through the following descriptions with reference to the accompanying drawings.

DETAILED DESCRIPTION OF THE PREFERRED EMBODIMENT

Figure 1:
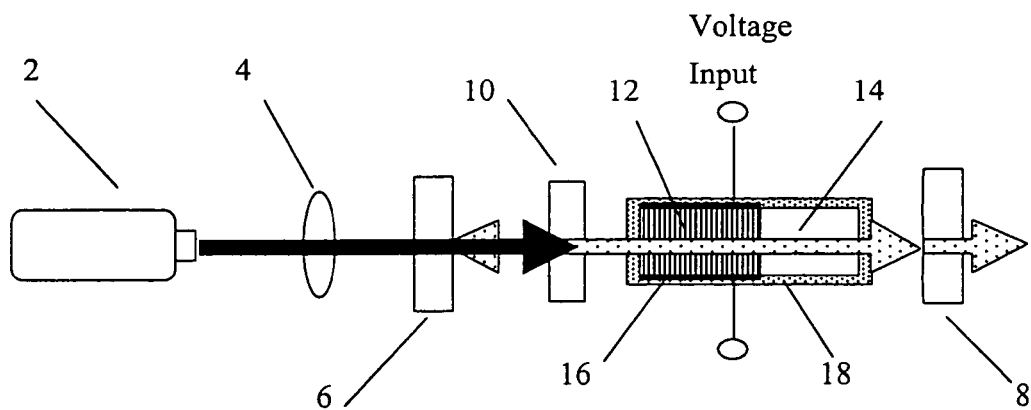
FIG. 1(A) schematically shows an actively Q-switched laser system adopting a QPM EO laser Q-switch according to a first preferred embodiment of the present invention.
FIG. 1(B) schematically shows an actively Q-switched laser system adopting a QPM EO laser Q-switch according to a second preferred embodiment of the present invention.
FIG. 1(C) schematically shows an actively Q-switched laser system adopting a QPM EO laser Q-switch according to a third preferred embodiment of the present invention.
FIG. 1(D) schematically shows an actively Q-switched laser system adopting a QPM EO laser Q-switch according to a fourth preferred embodiment of the present invention.
Figure 1:
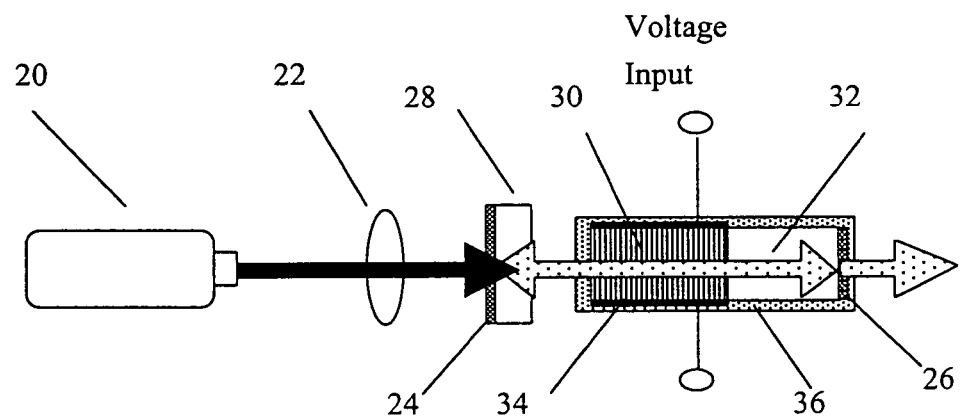
Figure 1:
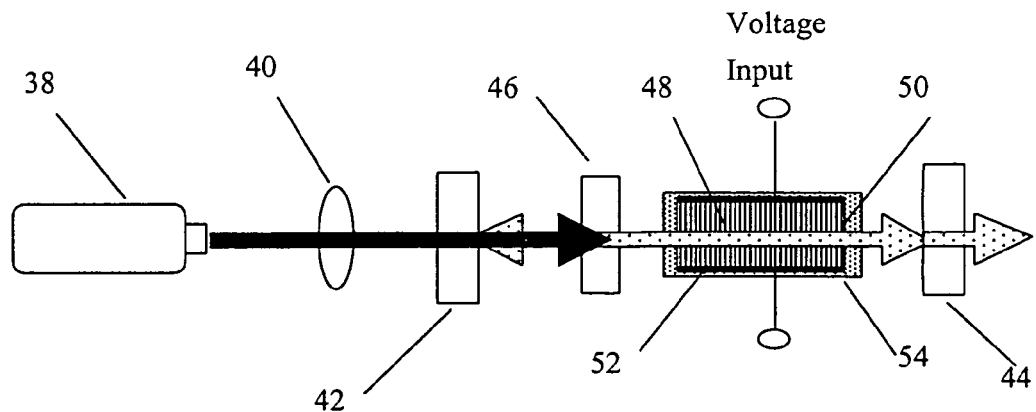
Figure 1:
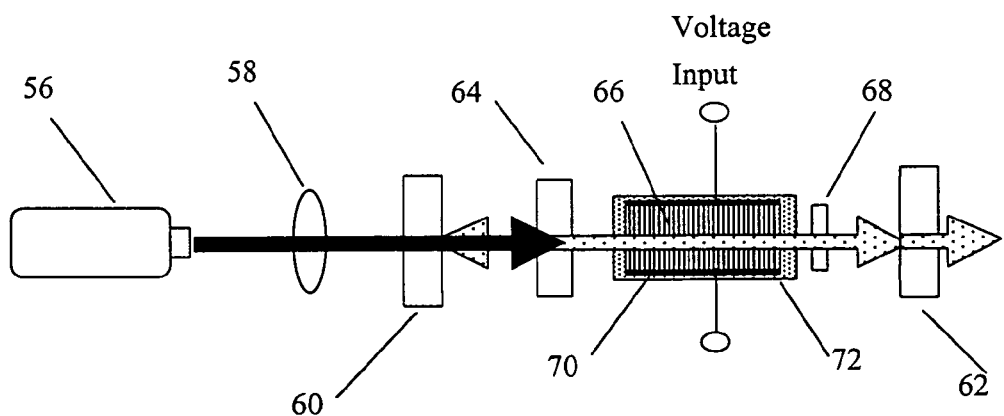

The actively Q-switched laser system adopting a QPM EO laser Q-switch according to the present invention at least includes an optical pump source, a laser gain medium, and a QPM EO crystal. A mode-matching lens can be used in this laser system to couple the optical pump source to the laser gain medium. A pair of laser cavity mirrors can also be used in this laser system to resonate the laser at the emission wavelength. The first preferred embodiments of the present invention are illustrated in FIGS. 1(A) through 1(D). The detailed descriptions of these preferred embodiments of the present invention will be addressed in the following with reference to FIGS. 1(A-D).

The optical pump source 2, 202, 38, 56 can be a laser source or any kind of light source that can emit certain wavelengths in the absorption spectrum of a laser gain medium 10, 28, 46, 64. Laser oscillation occurs when a certain laser pumping threshold is reached. The mode-matching lens 4, 22, 40, 58 may be coated with an anti-reflection layer at the optical pump wavelength, and has an appropriate focal length so as to receive and couple the energy of the optical pump source 2, 20, 38, 56 into the laser cavity for pumping the laser gain medium 10, 28, 46, 64. The laser cavity comprises of either a pair of cavity mirrors either a pair of cavity mirrors 6, 42, 60 and 8, 44, 62 or a pair of optical dielectric mirrors 24 and 26. The cavity mirrors 6, 42, 60 and 8, 44, 62 can be coated with optical coatings that transmit the optical pump energy and resonate the laser energy, and thereby achieving a good laser efficiency. The optical dielectric mirrors 24 and 26 can be optical dielectric multi-layers respectively coated on the end surface of the laser gain medium 28 facing the optical pump source 20 and the end surface of the quarter-wave retardar retarder 32 for laser output, having high transmission for the optical pump source 20 and adequate reflection at the resonant laser wavelengths, so as to achieve a good laser efficiency. In FIGS. 1(C) and 1(D), the cavity mirrors 42, 60 and 44, 62 can be replaced with the dielectric mirrors 24 and 26 shown in FIG. 2(B). in these preferred embodiments, laser Q-switching is accomplished in a polarization-dependent laser resonator system. A polarization-dependent resonant cavity can be implemented by dielectric coatings having polarization-dependent loss on the cavity mirrors 6, 42, 60 and 8, 44, 62 or the dielectric mirrors 24, 26; the polarization-dependent cavity can also be implanted by using a laser gain medium 10, 28, 46, 64 with a polarization-dependent laser gain (for instance, an a-cut Nd:YVO$_4$ crystal) or using a QPM EO crystal 12, 30, 48, 66 with a Brewster cutting angle; or the polarization-dependent cavity can also be preferably implemented by insertion of an intracavity polarization-dependent component such as a Brewster plate (or a polarization late) 68 to the laser cavity.

The laser Q-switch used in FIGS. 1(A) and 1(B) is an EO crystal comprising two sections, wherein the first section is a QPM EO crystal 12, 30, and the second section is a quarter-wave retarder 14, 32. The polarization direction of the resonant laser beam is rotated by preferably 45° when passing through the first crystal section under a quarter-wave voltage. The 45° polarization-rotated laser beam goes through a quarter-wave retarder 14, 32 in the second crystal section, is partially reflected by the cavity mirror 8, 26, goes through a quarter-wave retarder 14, 32 again, and traverses back the QPM EO crystal 12, 30. Upon the completion of a round-trip propagation, the laser polarization is rotated 90° and the laser sees a high resonator loss, if a quarter-wave voltage is applied to the QPM EO crystal 12, 30. For the case of no voltage applied to the QPM EO crystal 12, 30, the polarization direction of the resonating laser signal does not rotate and sees a much less resonator loss so that the laser can be built up in the laser gain medium 10, 28. This condition corresponds to the low-loss state of the laser cavity. The switching between a high resonator loss state and a low loss state is usually called Q-switching. In this manner, effective laser Q-switching can be accomplished by modulating the voltage applied to the QPM EO crystal 12, 30 via the electrodes 16, 34. In practice, the switching voltage can be less than the quarter-wave voltage, depending on the resonator design. In the embodiment shown in FIGS. 1(A) and 1(B), the QPM EO crystal 12, 30 and the quarter-wave retarder 14, 32 can be monolithically integrated in a single crystal substrate or be separately implemented as two discrete components.

The laser Q-switch shown in FIGS. 1(C) and 1(D) according to the first preferred embodiment of the present invention includes a QPM EO crystal 48 with a Brewster cutting angle 50 or a QPM EO crystal 66 cooperated with an additional Brewster plate (or polarization-dependent plate) 68. The QPM EO crystal 48, 66, when applied with a half-wave voltage, rotates the polarization direction of the laser signal going through it by 90°, and a significant part of the 90° rotated laser signal is reflected out of the laser cavity via the Brewster surface 50 (See FIG. 1(C)), which corresponds to a high-loss state of the Q-switched laser cavity. When no voltage is applied to the QPM EO crystal 48, the polarization direction of the resonating laser is not affected so that all the laser signal can pass through the Brewster surface 50 and thereby the laser oscillation can occur, which corresponds to the low-loss state of the Q-switched laser cavity. As a consequence, effective laser Q-switching can be accomplished by appropriately modulating the voltage applied to the QPM EO crystal 48 via the electrodes 52, 70. In practice, the switching voltage can be less than the half-wave voltage, depending on the resonator design. The aforementioned QPM EO crystal 48 with a Brewster surface 50 can be alternatively replaced by the combination of a QPM EO crystal 66 and a discrete Brewster plate (or a polarization-dependent loss plate) 68 (See FIG. 1(D)).

The Q-switched laser system of the present invention may employ a temperature control unit 18, 36, 54, 72 to control the temperature of the QPM EO crystal 12, 30, 48, 66 so as to fine tune performance of the QPM EO crystal 12, 30, 48, 66.

FIGS. 2(A) to 2(B) and FIGS. 3(A) to 3(B) illustrate a preferred embodiment of the arrangement of electrodes in the laser Q-switch 74, 75, 92, 93 of the Q-switched laser system. A detailed description of such preferred embodiment of the present invention is given below with reference to FIGS. 2(A) to 2(B) and FIGS. 3(A) to 3(B).

Figure 2:
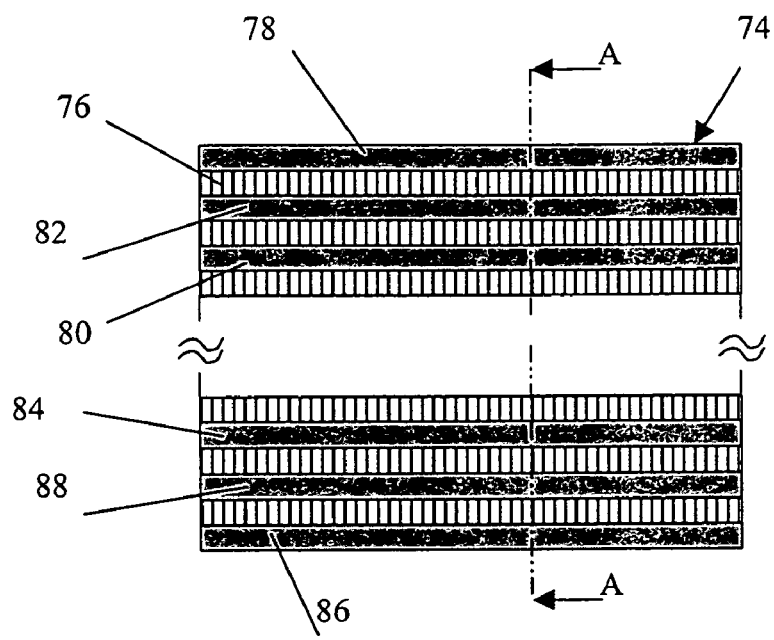
FIG. 2(A) illustrates the top view of a possible electrode configuration of the Q-switched laser system of the present invention.
FIG. 2(B) is a cross-sectional view taken from line A-A in FIG. 2(A)
Figure 2:
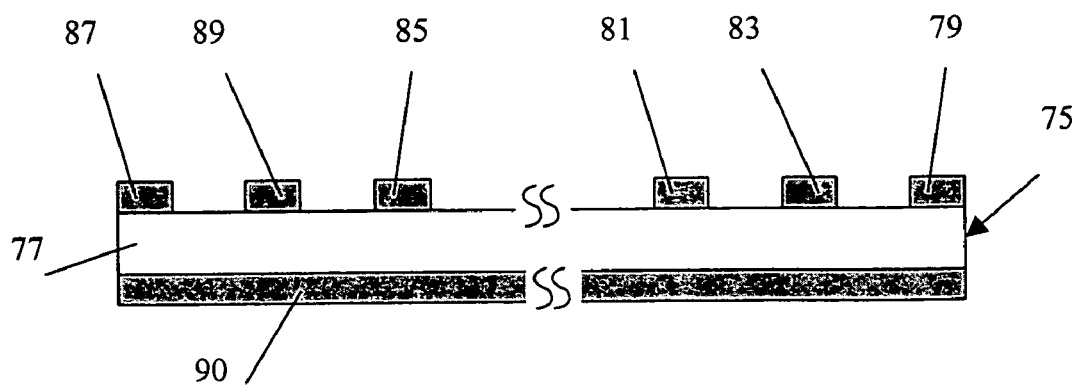
Figure 3:
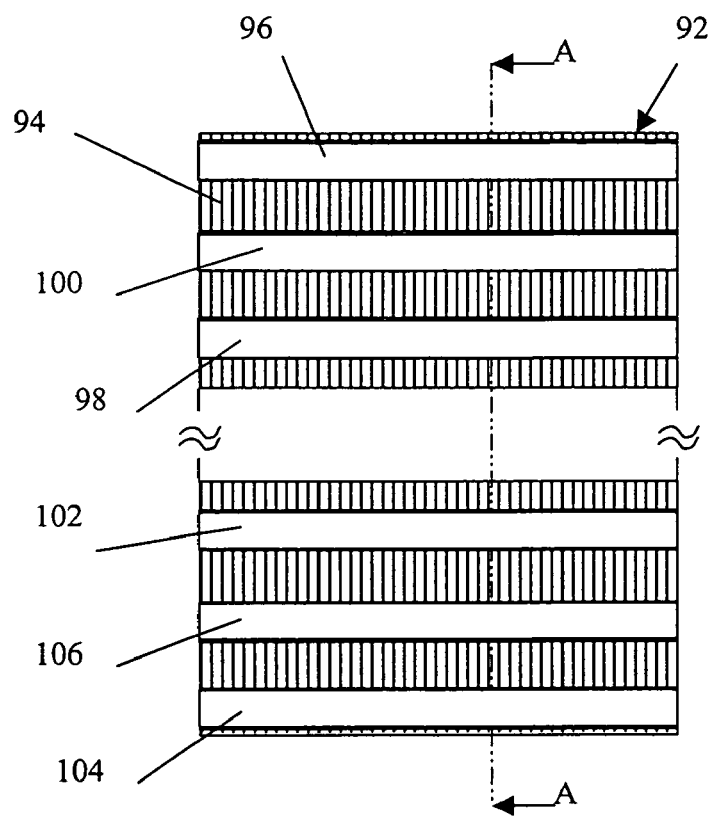
FIG. 3(A) illustrates the top view of another possible electrode configuration of the Q-switched laser system of the present invention.
FIG. 3(B) is a cross-sectional view taken from line A-A in FIG. 3(A)
Figure 3:
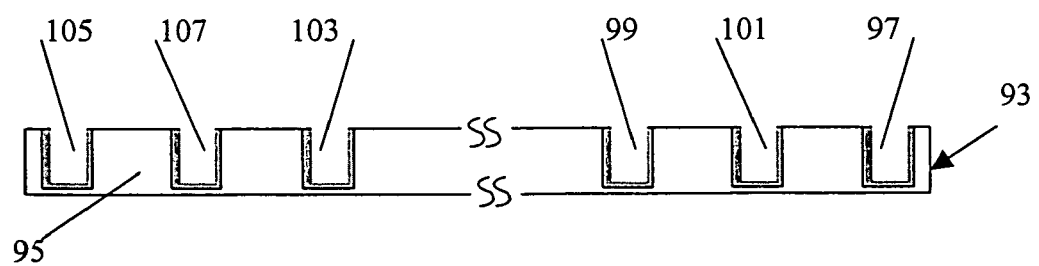
Figure 4:
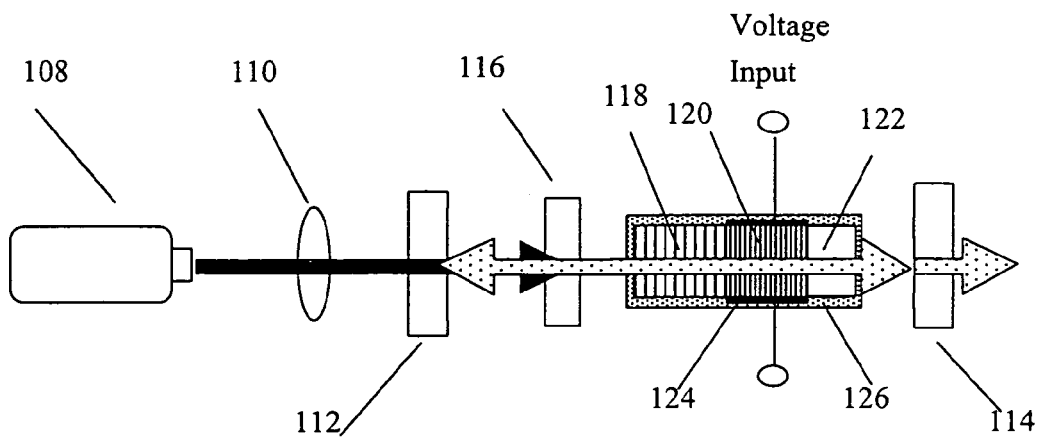
FIG. 4(A) schematically shows a wavelength conversion laser system adopting a QPM EO laser Q-switch and a nonlinear optical material according to a first preferred embodiment of the present invention.
FIG. 4(B) schematically shows a wavelength conversion laser system adopting a QPM EO laser Q-switch and a nonlinear optical material according to a second preferred embodiment of the present invention.
FIG. 4(C) schematically shows a wavelength conversion laser system adopting a QPM EO laser Q-switch and a nonlinear optical material according to a third preferred embodiment of the present invention.
FIG. 4(D) schematically shows a wavelength conversion laser system adopting a QPM EO laser Q-switch and a nonlinear optical material according to a fourth preferred embodiment of the present invention.
Figure 4:
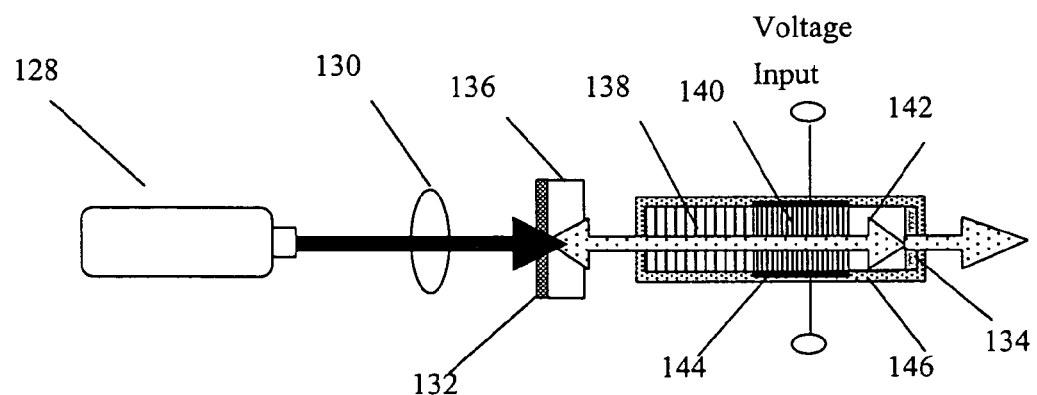
Figure 4:
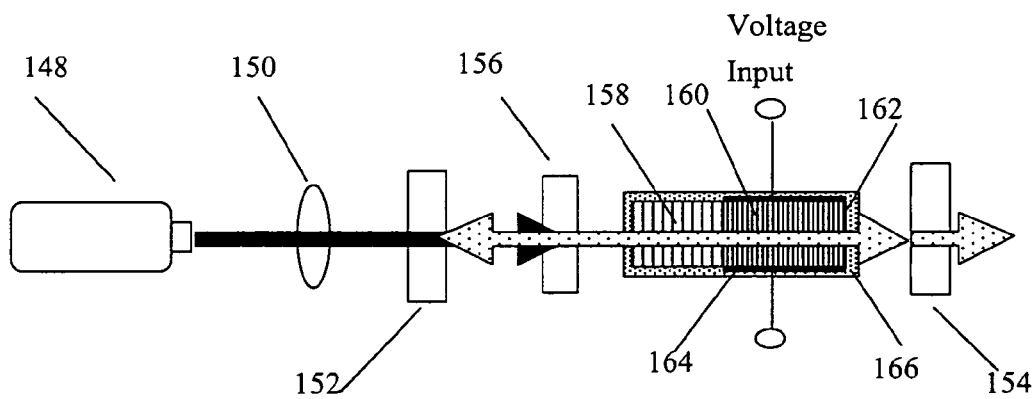
Figure 4:
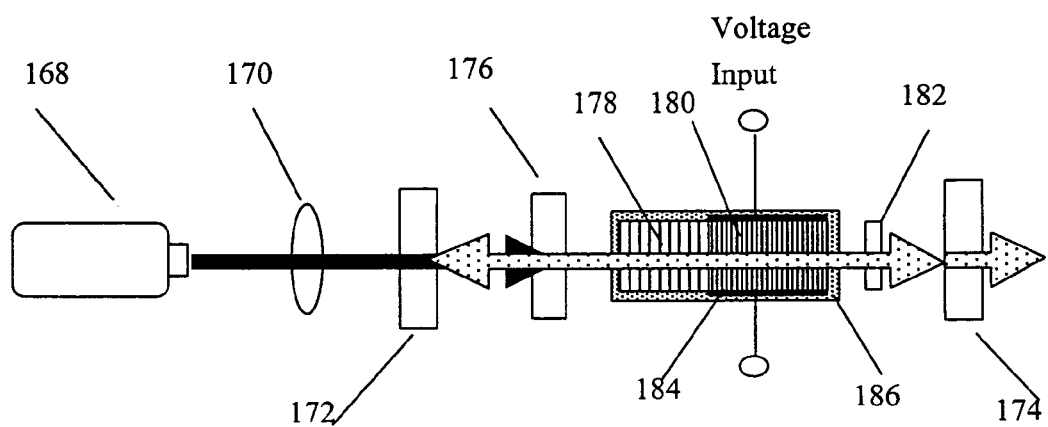

As shown from FIGS. 2(A) to 2(B), conducting electrodes 78, 80, 82, . . . , 84, 86, 88 and 79, 81, 83, . . . , 85, 87, 89 are arranged in parallel along the direction perpendicular to the incident laser beam on the QPM EO crystals 76 and 77. The voltages applied to the electrodes 78, 80, 82, . . . , 84, 86, 88 and 79, 81, 83, . . . , 85, 87, 89 are periodic in values; for example, the arrangement of the voltages of these electrodes can be +,−,+, . . . ,+,−,+ or −,+, . . . ,−,+,−, wherein "+" indicates an electric potential and "−" indicates a relative low electric potential. The electrode 90 can have a relative low electric potential. In practical operation, laser polarization is rotated in the QPM EO crystals 76, 77 when the laser signal passes through one of the areas beneath the surface between electrodes 78, 80, 82, . . . , 84, 86, 88 and 79, 81, 83, . . . , 85, 87, 89. Referring to FIGS. 3(A) and 3(B), trench-shaped electrodes 96, 98, 100, . . . , 102, 104, 106 and 97, 99, 101, . . . , 103, 105, 107 are arranged in parallel along the direction perpendicular to the incident laser beam on the QPM EO crystals 94 and 95. The voltages applied to the electrodes 96, 98, 100, . . . , 102, 104, 106 and 97, 99, 101, . . . , 103, 105, 107 are periodic in values, for example, the arrangement of the voltages of these electrodes can be +,−,+, . . . ,+,−,+ or −,+,− . . . ,−,+,−, wherein "+" indicates an electric potential and indicates a relative low electric potential. In practical operation, laser polarization is rotated in the QPM EO crystals 94, 95 when the laser signal goes through one of the areas between the electrodes 96, 98, 100, . . . , 102, 104, 106 and 97, 99, 101, . . . , 103, 105, 107.

Another alternative configuration of the present invention reveals an actively Q-switched wavelength-conversion and wavelength-tunable laser system containing an intracavity nonlinear optical material in the actively Q-switched laser system adopting a QPM EO laser Q-switch. A detailed description to the preferred embodiments of the actively Q-switched wavelength-conversion and wavelength-tunable laser system is given below with reference to FIGS. 4(A) to 4(D).

The components of the actively Q-switched wavelength-conversion and wavelength-tunable laser system of the present invention are depicted in FIGS. 4(A) to 4(D). Those components include optical pump source 108, 128, 148, 168, mode-matching lens 110, 130, 150, 170, laser gain medium 116, 136, 156, 176, QPM EO crystal 120, 140, 160, 180, quarter-wave retardar 122, 142, electrodes 124, 144, 164, 184, Brewster-cut surface 162, Brewster plate (or polarization-dependent loss plate) 182, laser cavity mirrors 112, 152, 172 and 114, 154, 174, dielectric mirrors 132 and 134, and temperature control unit 126, 146, 166, 186, which, in functions, are identical to the optical pump source 2, 20, 38, 56, mode-matching lens 4, 22, 40, 58, laser gain medium 10, 28, 46, 64, QPM EO crystal 12, 30, 48, 66, quarter-wave retardar 14, 32, electrodes 16, 34, 52, 70, Brewster-cut surface 50, Brewster plate (or polarization-dependent loss plate) 68, laser cavity mirrors 6, 42, 60 and 8, 44, 62, dielectric mirrors 24 and 26, and temperature control unit 18, 36, 54, 72 of the aforementioned Q-switched laser system adopting a QPM EO laser Q-switch. The QPM EO Q-switch, the Q-switch voltage, and the physical arrangement of the Q-switch electrodes are also identical to those labeled with the reference numerals 74, 75, 92, 93 for the aforementioned Q-switched laser system.

Figure 5:
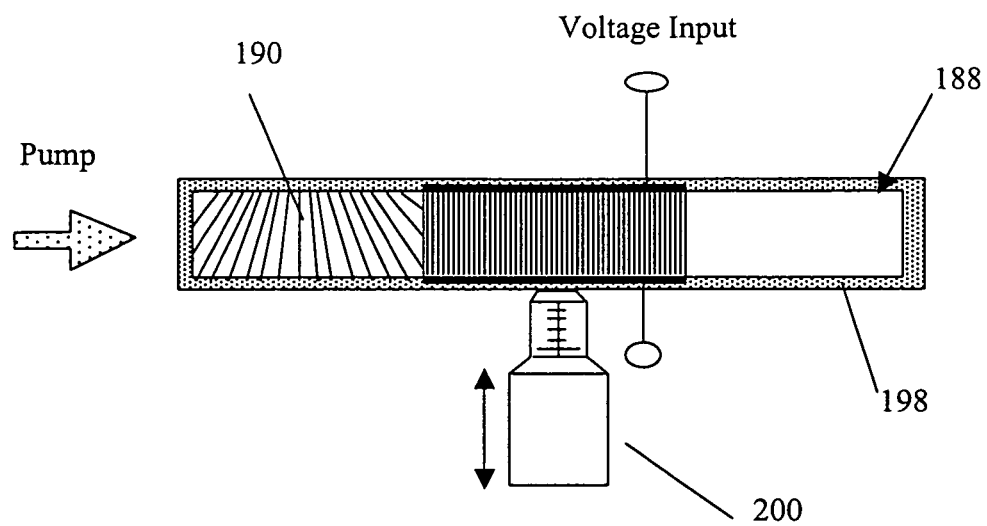
FIG. 5(A) illustrates a possible way of implementing a cascaded QPM crystal in a monolithic nonlinear optical crystal to achieve laser Q-switch, wavelength conversion, and wavelength tuning simultaneously.
FIG. 5(B) illustrates another possible way of implementing a cascaded QPM crystal in a monolithic nonlinear optical crystal to achieve laser Q-switch, wavelength conversion, and wavelength tuning simultaneously.
Figure 5:
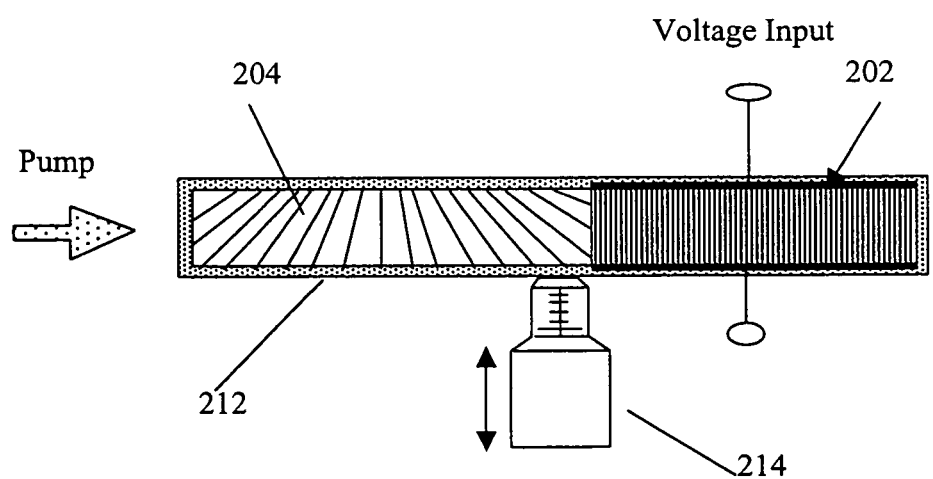

However, in these preferred embodiments, the additional nonlinear crystal 118, 138, 158, 178 can be a QPM nonlinear optical crystal cascaded to the QPM EO crystal 120, 140, 160, 180 of the same material in a monolithic crystal substrate. FIGS. 5(A) and 5(B) illustrate two possible ways of implementing the monolithically cascaded QPM crystals 188 and 202, respectively. According to the present invention, the Q-switched laser systems shown in FIGS. 4(A) to 4(D) are used for performing the desired intracavity wavelength conversions, including, but not limited to, second harmonic generation, sum frequency generation, difference frequency generation, optical parametric generation, amplification, and oscillation, etc. The laser cavity mirrors 112, 152, 172 and 114, 154, 174 and dielectric mirrors 132 and 134 all have the appropriate spectral characteristics of supporting laser oscillation at the emission wavelength of the laser gain medium and optimizing the intracavity wavelength conversion. By using a monolithically cascaded QPM crystal for laser Q-switching and wavelength conversion, the actively Q-switched wavelength-conversion and wavelength-tunable laser system of the present invention can achieve continuous wavelength tuning either by transversely selecting a grating period of the QPM nonlinear optical crystal 190, 204 with a fan-out grating with a micrometer actuator 200, 214 or by varying the temperature of the QPM nonlinear optical crystal 190, 204 with a temperature control unit 198, 212.

The most significant feature of the present invention is that the laser Q-switch and wavelength conversion device can be integrated in a monolithic crystal substrate. Alternatively, they can be separately implemented as two discrete components from the same or two different materials. For example, the laser Q-switch can be implemented with a PPLN crystal, whereas the wavelength converter can be implemented with a KTP, a Beta Barium Borate crystal (BBO), a Lithium Triborate crystal (LBO), a PPLN crystal, a periodically poled Potassium Titanyl Phosphate crystal (PPKTP), or a periodically poled Lithium Tantalite crystal (PPLT), etc.

The distinct characteristics of the actively Q-switched laser system according to the present invention have become clear from the descriptions of the preferred embodiments hereinbefore, which are summarized as follows:

1. A lower switching voltage can be achieved by using a QPM EO crystal as a laser Q-switch rather than using a conventional EO laser Q-switch in prior arts. In a transverse amplitude modulator, the half-wave voltage of an EO PPLN crystal is only one half that of a conventional EO LN crystal, and is only 40% that of a KTP crystal, and is even only one tenth of that of a KDP crystal under the same electrode configuration.

2. By using a QPM EO crystal as an EO laser Q-switch, one can at least have the following different laser system configurations:

In the case of selecting a laser gain medium with a polarization-sensitive gain to accomplish a polarization-dependent laser cavity, the EO Q-switch may consist of a QPM EO crystal and a quarter-wave retarder. When no voltage is applied to the QPM EO crystal, the laser cavity is in a low-loss state. In operation, the EO Q-switch is applied with a quarter-waver voltage to reach a cavity high-loss state. The QPM EO crystal and the quarter wave retarder may be either cascaded on a monolithic crystal or separated as two discrete components.

The electro-optic Q-switch can also be a QPM EO crystal with a Brewster cutting angle, or alternatively, simply a QPM EO crystal cascaded to a separated intracavity Brewster plate. When no voltage is applied to the QPM EO crystal, the laser cavity again is in a low-loss state. In operation, the EO Q-switch is applied with a half-wave voltage to reach a cavity high-loss state. With the above schemes, laser Q-switching can be achieved effectively by an appropriate modulation voltage.

3. The ability of the QPM EO crystal in rotating the polarization direction of the incident laser beam is restricted to a certain acceptance bandwidth of laser frequency (wavelength) and crystal temperature, which resembles the operation conditions in a QPM crystal for nonlinear frequency conversion. The acceptance bandwidth for laser frequency and crystal temperature is determined by the dimension and the property of the material.

In addition to the aforementioned features of the actively Q-switched wavelength-conversion and wavelength-tunable laser system, the laser system according to the present invention further has the following unique characteristics:

1. Both the laser Q-switch and nonlinear wavelength converter adopt a QPM crystal of the same material, so that the Q-switch and the wavelength converter can be integrated onto the same material substrate. Monolithic integration of multi-functional QPM devices for laser Q-switching and wavelength conversion in a monolithic crystal substrate is a major advantage of the present invention.

2. Compared with the prior art that uses an external-cavity pump configuration for a nonlinear crystal, using the higher intracavity power for a nonlinear crystal according to the present invention is superior in easing the system requirements for the wall-plug power and therefore increasing the overall conversion efficiency.

3. The use of a QPM nonlinear optical crystal cascaded to the QPM EO crystal as a nonlinear wavelength converter has the advantage of maximizing the wavelength conversion efficiency without having the walk-off problem generally encountered in a conventional birefringence crystal.

While the present invention has been described in terms of what are presently considered to be the most practical and preferred embodiments, it is to be understood that the present invention need not be restricted to the disclosed embodiments. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. An actively Q-switched laser system, comprising: a laser gain medium;
an optical pump source for providing an excitation energy to the laser gain medium;
a laser resonator for resonating the laser photons emitted from the laser gain medium being positioned therein; and
an electro-optic crystal positioned in the laser resonator and functioning as a laser Q-switch for accumulating the photon energy in the laser gain medium under a first state and releasing the energy accumulated in the laser gain medium under a second state;
wherein the electro-optic crystal comprises a quasi-phase-matched electro-optic crystal, comprising a periodically poled lithium niobate (PPLN) crystal, a periodically poled lithium tantalite (PPLT) crystal, or a periodically poled potassium titanyl phosphate (PP-KTP) crystal acting as a polarization rotator, and a quarter-wave retarder, a Brewster plate or a polarization-dependent loss element; wherein the electro-optic crystal comprises a plurality of surface electrodes parallel to the direction of the laser beam propagation; and wherein the surface electrodes are applied with a voltage between two successive of them for controlling the polarization direction of the resonant laser beam passing through the area of the electro-optic crystal beneath the surface between the electrodes, thereby switching the laser resonator between the first state and the second state.

2. The actively Q-switched laser system of claim 1 wherein the laser resonator further comprises a pair of laser cavity mirrors for attaining a laser oscillation condition.

3. The actively Q-switched laser system of claim 1 wherein the laser resonator further comprises a pair of dielectric mirrors respectively coated on the end surface of the laser gain medium facing the optical pump source and on the laser output surface of the electro-optic crystal for attaining a laser oscillation condition.

4. The actively Q-switched laser system of claim 1 wherein the laser resonator further comprises a laser cavity mirror and a dielectric mirror coated on the laser output surface of the electro-optic crystal for attaining a laser laser oscillation condition.

5. The actively Q-switched laser system of claim 1 wherein the laser resonator further comprises a dielectric mirror coated on the end surface of the laser gain medium facing the optical pump source and a laser cavity mirror for attaining a laser oscillation condition.

6. The actively Q-switched laser system of claim 1 wherein the optical pump source is a laser source or an incoherent light source that emits specific wavelength in the absorption spectrum of the laser gain medium.

7. The actively Q-switched laser system of claim 1 further comprising at lease one mode-matching lens for allowing coupling of the optical pump energy to the laser gain medium.

8. The actively Q-switched laser system of claim 1 wherein the electro-optic crystal is a quasi-phase-matched electro-optic crystal, comprising a periodically poled lithium niobate (PPLN) crystal, a periodically poled lithium tantalite (PPLT) crystal, or a periodically poled potassium titanyl phosphate (PP-KTP) crystal acting as a polarization rotator and having a Brewster cutting surface.

9. The actively Q-switched laser system of claim 1 wherein the electro-optic crystal comprises a plurality of parallel trench-shaped electrodes inside the electro-optic crystal along the laser propagation direction.

10. The actively Q-switched laser system of claim 9 wherein the trench-shaped electrodes are applied with a voltage between two successive one of them for controlling the polarization direction of the resonant laser beam passing through the area of the electro-optic crystal between the electrodes, thereby switching the laser resonator between the first state and the-second state.

* * * * *